(12) United States Patent
Giebmanns

(10) Patent No.: US 6,428,250 B2
(45) Date of Patent: Aug. 6, 2002

(54) DRILL BIT FOR WOOD DRILLING

(76) Inventor: Karl-Heinz Giebmanns, 10 Cedardale Ct., Palm Coast, FL (US) 32137

(*) Notice: Subject to any disclaimer, the term of this patent is extended or adjusted under 35 U.S.C. 154(b) by 0 days.

(21) Appl. No.: 09/776,457

(22) Filed: Feb. 2, 2001

(30) Foreign Application Priority Data

Feb. 2, 2000 (DE) .......................................... 100 04 485
Feb. 19, 2000 (DE) .......................................... 100 07 736

(51) Int. Cl.⁷ .............................................. B23B 51/02
(52) U.S. Cl. ...................... 408/214; 408/224; 408/225
(58) Field of Search ................................. 408/214, 210, 408/215–218, 222–225

(56) References Cited

U.S. PATENT DOCUMENTS

| | | | |
|---|---|---|---|
| 177,742 A | * | 5/1876 | Noton .......................... 408/214 |
| 2,358,077 A | | 9/1944 | Koett |
| 2,883,888 A | | 4/1959 | Stewart |
| 3,064,699 A | | 11/1962 | Gleason |
| 3,180,379 A | | 4/1965 | Stewart |
| 4,127,355 A | * | 11/1978 | Oakes ........................... 408/225 |
| 4,536,107 A | * | 8/1985 | Sandy et al. ................... 408/214 |
| 4,582,458 A | * | 4/1986 | Korb et al. .................... 408/224 |

FOREIGN PATENT DOCUMENTS

DE    90 01 633.5    7/1990

\* cited by examiner

*Primary Examiner*—Steven C. Bishop
(74) *Attorney, Agent, or Firm*—R W Becker & Associates; R W Becker

(57) ABSTRACT

A drill bit for drilling a hole of a selected diameter in a wood workpiece includes a conically shaped tip having a main cutting portion and a thread series operable to threadingly draw the drill bit into the wood workpiece. The thread series has a diameter which progressively increases in a direction opposite to the drilling penetration direction of movement of the drill bit to a maximum diameter which is the same as the selected diameter of the hole to be drilled. The drill bit also includes a cylindrical portion extending from the conically shaped tip, a spiral screw shaped splinter groove for conducting splinters in the drilled hole away from the drill bit penetration area and a centering drill portion with a self cutting thread series.

18 Claims, 1 Drawing Sheet

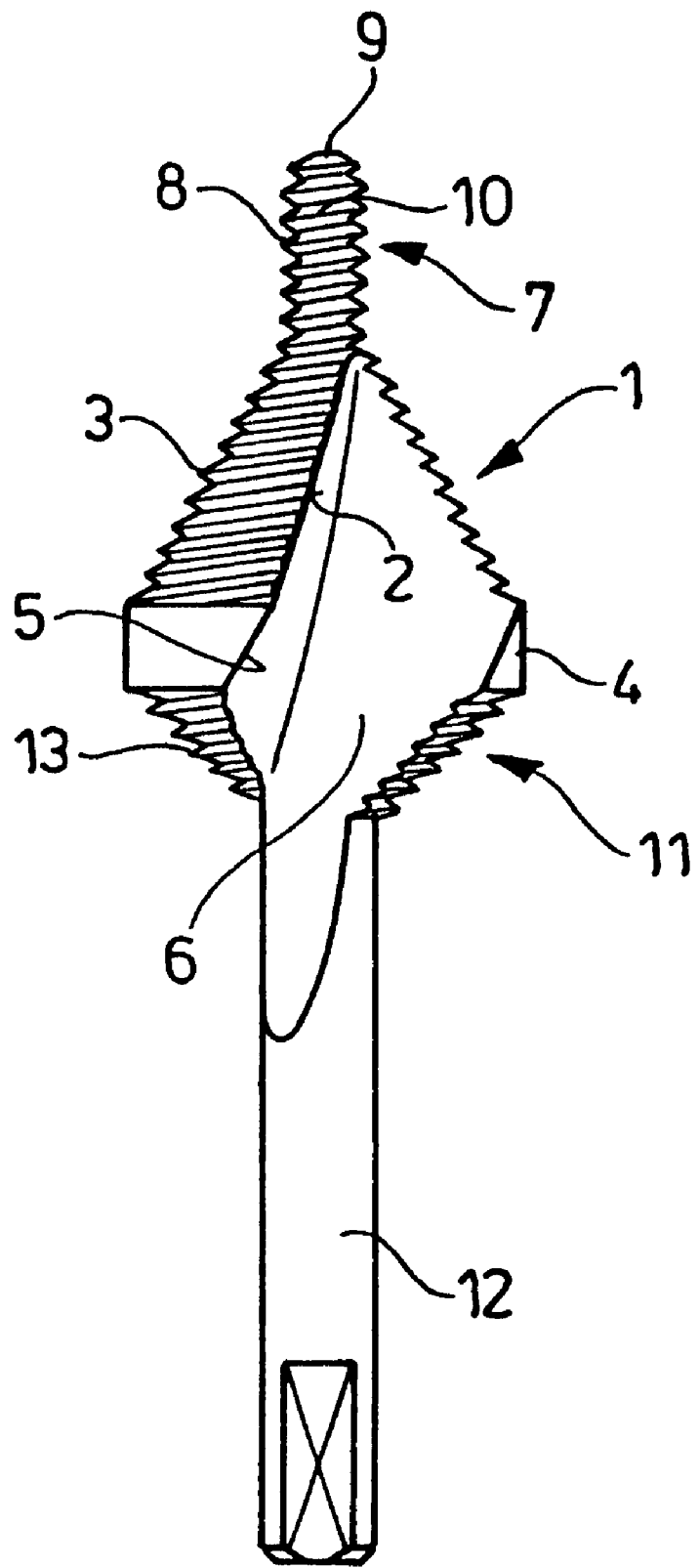

DRILL BIT FOR WOOD DRILLING

BACKGROUND OF THE INVENTION

The present invention relates to a drill bit for drilling holes in a wood workpiece and, more particularly, to a drill bit for drilling holes having a diameter of more than 10 mm.

A known drill bit such as, for example, the drill bit disclosed in U.S. Pat. No. 2,358,077, is configured as a special tool piece and includes a conical tip having a thread series operable to draw or thread in the drill bit into the wood workpiece, as well as a cylindrical portion provided with a spiral screw shaped splinter groove and having a relatively large diameter. A substantially radial vertically extending main cutting portion is located at the area of the beginning of the cylindrical portion and this main cutting portion is followed by an axially extending side cutting portion of the cylindrical portion extending at an angle to the main cutting portion.

Other known drill bits of this type, which are disclosed in U.S. Pat. No. 2,883,888, U.S. Pat. No. 3,180,379, and U.S. Pat. No. 3,064,699, additionally include a thread series in the cylindrical portion which cuts a threaded wall in the hole being drilled and guides the drill bit along the hole. Since this threaded wall remains in the hole after the hole has been drilled to the desired depth, it is only possible to withdraw the drill bit from the now completed hole by a reverse threading movement of the drill bit and this process disadvantageously adds to the time for the drilling operation. Moreover, as noted, the wall of the hole is not smooth surfaced but has, instead, threads.

The noted drill bits are used in many situations and can have a length up to 450 mm. A disadvantage of these known drill bits, as well as of the typical spiral drill bits, is that they break through the backside of the wood workpiece being drilled in a manner of impact which produces splinters, whereby the backside of the wood workpiece does not have a hole with a clean lip.

German Patent Publication G 90 01 633.5 discloses a cutting tool piece having a cutting portion 1 which has three cutting angles 3 and three cutting grooves 4. The three cutting angles 3 lie on a conical sleeve surface.

SUMMARY OF THE INVENTION

The present invention provides a drill bit which solves the challenge of providing an improved drill bit which permits easy manufacture thereof and avoids to the greatest extent possible a breaking through of the backside of the wood workpiece being drilled as well as the challenge of providing a drill bit which minimizes the magnitude of the drill penetration force which needs to be applied to the drill bit during the drilling operation.

To solve the challenge of providing such a drill bit, the present invention provides a drill bit having a conically shaped tip with at least one main cutting portion and having a thread series which draws the drill bit into the wood workpiece, with the conically shaped tip having a diameter the same as the selected diameter of the hole to be drilled in the wood workpiece. The thread series of the conically shaped tip reduces the drill penetration force which needs to be applied to the drill bit, not only because the thread series operates to draw or thread itself into the wood workpiece, but also because the use of the thread series results in many fine cuttings or shavings which are virtually in the form of saw cuttings. Since the thread series exerts a constant pulling along effect on the conically shaped tip as the drill bit pierces the backside of the wood workpiece, there is no sudden breaking through of the backside of the wood workpiece; instead, the wood in this area is cut into small cuttings, thereby ensuring a clean lip on the hole on the backside of the wood workpiece.

In an advantageous configuration of the drill bit of the present invention, the drill bit includes a cylindrical, non-threaded portion operable to guide the drill bit into the hole, the cylindrical, non-threaded portion transitioning into the conically shaped tip and having a side cutting portion.

The drill bit of the present invention can include at least one axially extending, preferably spiral screw shaped, splinter groove.

In a particularly advantageous embodiment of the drill bit of the present invention, the conically shaped tip is provided with a central drill portion of a relatively small diameter extending in the direction of the drill penetrating movement of the drill bit, and the central drill portion has a thread series having the same steepness or slope gradient as the thread series of the conically shaped tip. In the event that the thread series of the central drill portion is configured as a self cutting thread series, it is possible for the central drill portion to bore into the wood without any special force application on the drill bit, and the thread series of the central drill portion reinforces in this manner the operation of the thread series of the conically shaped tip in drawing in the drill bit into the hole without the need to apply a special drill penetrating force to the drill bit.

If the thread series of the conically shaped tip is configured with a smaller steepness or slope gradient than the thread series of the central drill portion, or if the thread series of the conically shaped tip is double threaded, an advantageous size reduction is achieved with respect to the cuttings produced by the conically shaped tip and this facilitates the carrying away of the cuttings.

The central drilling portion can, in the same manner as the conically shaped tip and the cylindrical portion, be provided with at least one spiral screw shaped splinter groove which can be configured as an extension of the splinter groove in the conically shaped tip and the cylindrical portion.

The central drilling portion preferably includes a self cutting thread series so as to eliminate the need to drill a locating hole to set the drill bit in its initial drilling position.

If the drill bit is to be used to drill a blind hole in the wood workpiece—a hole extending only partially through the wood workpiece—instead of a through hole, it is necessary to reverse the rotation direction of the drill bit upon reaching the desired depth. In this connection, the drill bit of the present invention is moved in a reverse withdrawal direction to withdraw it from the hole in the wood workpiece, which is an operation that cannot be performed with conventional drill bits without additional modification. This reverse movement of the drill bit can be facilitated by a conical transition portion which extends from the conically shaped tip or the cylindrical portion to a shaft of relatively small diameter, whereby the conical transition portion is provided with a thread series having the same thread handedness as the thread series of the conically shaped tip. If, on the other hand, the thread series of the conical transition portion has a thread handedness opposite to the thread handedness of the thread series of the conically shaped tip, it is not necessary to reverse the rotation of the drill bit to withdraw the drill bit from the hole. The steepness or slope gradient of the thread series of the conical transition portion can be the same or different than the steepness or slope gradient of the thread series of the conically shaped tip.

BRIEF DESCRIPTION OF THE DRAWING

The sole figure of the drawing is an elevational front view, in partial section, of the preferred embodiment of the drill bit of the present invention.

DETAILED DESCRIPTION OF THE PREFERRED EMBODIMENT

The preferred embodiment of the drill bit of the present invention is shown in the sole figure of the drawing and includes a conically shaped tip 1 which has a splinter groove 6 extending in a spiral screw shape and defining thereby a main cutting portion 2. The conically shaped tip 1 is provided with a thread series 3. A cylindrical portion 4 transitions into the conically shaped tip 1 and together with the spiral screw shaped splinter groove 6 defines a side cutting portion 5. A centering drill portion 7 is formed as an extension of the conically shaped tip 1 in the drill bit penetration direction and the central or centering drill portion 7 includes a cylindrical region 10 and a conically shaped drill point 9. A self cutting thread series 8, which begins at the conically shaped drill point 9, has the same steepness or slope gradient as the thread series 3 on the conically shaped tip 1 and transitions in an uninterrupted manner into the conically shaped tip 1.

The thread series 3 on the conically shaped tip 1 can alternatively have a smaller steepness or slope gradient than that of the thread series 8 on the centering drill portion 7, or can be double threaded so that the teeth height and width are reduced relative to those of the thread series 8 on the drill portion 7. In this manner, a beneficial size reduction is achieved in the splinters which occur during drilling operations with the drill bit.

A conical transition portion 11 transitions into the cylindrical portion 4 and this conical transition portion is followed, with respect to the direction of movement of the drill bit during its penetration into the workpiece, by a shaft 12 having a small diameter. The conical transition portion 11 is also provided with a thread series 13 which has the same thread handedness as the thread series 8.

The drill bit is operable to form a hole in a wood workpiece which has the diameter of the cylindrical portion 4 and, in such a drilling operation, the conically shaped drill point 9 is disposed on the wood workpiece at the location to be drilled and the drill point drills or threads itself into the wood workpiece due to the self cutting action of the thread series 8. Once the conically shaped tip 1 has penetrated into the wood workpiece, the hole formed by the drill bit is widened until the cylindrical portion 4 has penetrated into the wood workpiece. Thereafter, the hole formed by the drill bit as it continues to penetrate the wood workpiece has the diameter of the cylindrical portion 4.

The drill bit is drawn or threaded into the wood workpiece due to the action of the thread series 8 on the centering drill portion 7 and the thread series of the conically shaped tip 1 without the need to apply a penetration force on the drill bit. It is sufficient to merely guide the drill bit so that it does not deviate from the selected drilling path.

Since the main cutting portion 2 is, in correspondence with the profile of the thread series 3, formed in a saw tooth profile, only fine splinters occur during drilling which may take the form of fine saw splinters, depending upon the type of wood workpiece. Accordingly, there is ensured a good carrying off of the splinters via the spiral screw shaped splinter groove 6 and the annular space between the drilled hole in the wood workpiece and the shaft 12.

Since the drill bit draws itself into the wood workpiece due to the action of the thread series 8 and the thread series 3, whereby, at the same time, a machine cutting follows and thereby no or substantially no strong penetration force need be applied to the drill bit, the drill bit does not, as it arrives at the backside of the wood workpiece, break through the backside. Instead, the drill bit machine cuts as well this last portion of the wood workpiece, after movement therethrough of the centering drill portion 7, in such a manner that a breaking through and splintering of the drill hole on the backside does not occur.

If the drill bit is to be used to drill a blind hole in the wood workpiece—a hole extending only partially through the wood workpiece—instead of a through hole, the rotation direction of the drill bit is reversed upon reaching the desired depth and the drill bit moves in reverse in a withdrawal direction to withdraw from the hole in the wood workpiece. This reverse movement of the drill bit is facilitated by the thread series 13 on the conical transition portion 11, which extends from the cylindrical portion 4 to the shaft 12, as the thread series 13 threads through the splinters which have collected within the hole on the drill bit and leads the drill bit in the reverse direction out of the drilled hole.

It is to be understood that the drill bit can be provided with more than one—i.e., a plurality—of spiral screw shaped splinter grooves 6 which do not necessarily need to be of a spiral screw shape but can, instead, comprise an axially extending course.

The specification incorporates by reference the disclosure of German priority documents 100 04 485.9 of Feb. 2, 2000 and 100 07 736.6 of Feb. 19, 2000.

The present invention is, of course, in no way restricted to the specific disclosure of the specification and drawings, but also encompasses any modifications within the scope of the appended claims.

What I claim is:

1. A drill bit for drilling a hole of a selected diameter in a wood workpiece, comprising:
   a conically shaped tip having a main cutting portion and a double threaded thread series operable to threadingly draw the drill bit into the wood workpiece, the thread series having a diameter which progressively increases in a direction opposite to the drilling penetration direction of movement of the drill bit to a maximum diameter which is the same as the selected diameter of the hole to be drilled; and
   a centering drill portion extending axially from the conically shaped tip in the drilling penetration direction of movement of the drill bit and having a relative small diameter.

2. A drill bit according to claim 1, and further comprising a cylindrical portion extending from the conically shaped tip in the direction opposite to the drilling penetration direction of movement of the drill bit and having a side cutting portion.

3. A drill bit according to claim 1, and further comprising a spiral screw shaped splinter groove for conducting splinters in the drilled hole away from the drill bit penetration area.

4. A drill bit according to claim 1, wherein the centering drill portion includes a thread series having the same steepness or slope gradient as the thread series of the conically shaped tip.

5. A drill bit according to claim 1, wherein the centering drill portion includes a self cutting thread series having a steepness or slope gradient different than the steepness or slope gradient of the thread series of the conically shaped tip.

6. A drill bit according to claim 1, wherein the centering drill portion includes at least one spiral screw shaped splinter groove.

7. A drill bit according to claim 1, wherein the centering drill portion includes a conical drill point and a cylindrical portion extending from the conical tip.

8. A drill bit according to claim 7, wherein the centering drill portion includes a self cutting thread series.

9. A drill bit for drilling a hole of a selected diameter in a wood workpiece, comprising:

a conically shaped tip having a main cutting portion and a thread series operable to threadingly draw the drill bit into the wood workpiece, the thread series having a diameter which progressively increases in a direction opposite to the drilling penetration direction of movement of the drill bit to a maximum diameter which is the same as the selected diameter of the hole to be drilled;

a shaft portion having a smaller diameter than the thread series of the conically shaped tip and disposed upstream of the conically shaped tip in the direction opposite to the drilling penetration direction of movement of the drill bit, and a conically shaped transition portion tapering from the conically shaped tip to the shaft and having a thread series which has a thread handedness which is a selected one of a thread handedness the same as the thread handedness of the thread series of the conically shaped tip and a thread handedness the opposite as the thread handedness of the thread series of the conically shaped tip.

10. A drill bit according to claim 9, and further comprising a centering drill portion extending axially from the conically shaped tip in the drilling penetration direction of movement of the drill bit and having a relative small diameter.

11. A drill bit according to claim 9, wherein the thread series of the conically shaped tip is double threaded.

12. A drill bit according to claim 9, and further comprising a cylindrical portion extending from the conically shaped tip in the direction opposite to the drilling penetration direction of movement of the drill bit and having a side cutting portion.

13. A drill bit according to claim 9, and further comprising a spiral screw shaped splinter groove for conducting splinters in the drilled hole away form the drill bit penetration area.

14. A drill bit according to claim 10, wherein the centering drill portion includes a thread series having the same steepness or slope gradient as the thread series of the conically shaped tip.

15. A drill bit according to claim 10, wherein the centering drill portion includes a self cutting thread series having a steepness or slope gradient different than the steepness or slope gradient of the thread series of the conically shaped tip.

16. A drill bit according to claim 10, wherein the centering drill portion includes at least one spiral screw shaped splinter groove.

17. A drill bit according to claim 10, wherein the centering drill portion includes a conical drill point and a cylindrical portion extending from the conical tip.

18. A drill bit according to claim 17, wherein the centering drill portion includes a self cutting thread series.

* * * * *